No. 800,445. PATENTED SEPT. 26, 1905.
J. T. HOURIHAN.
TRUCK.
APPLICATION FILED DEC. 19, 1904.
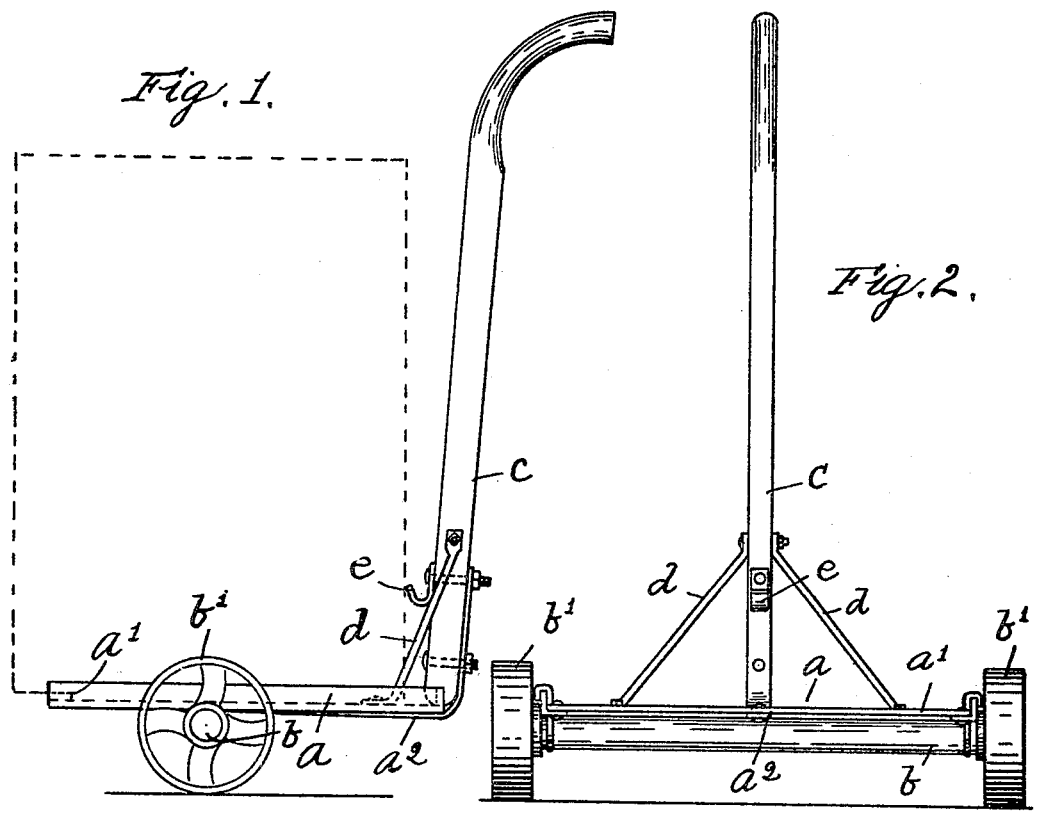
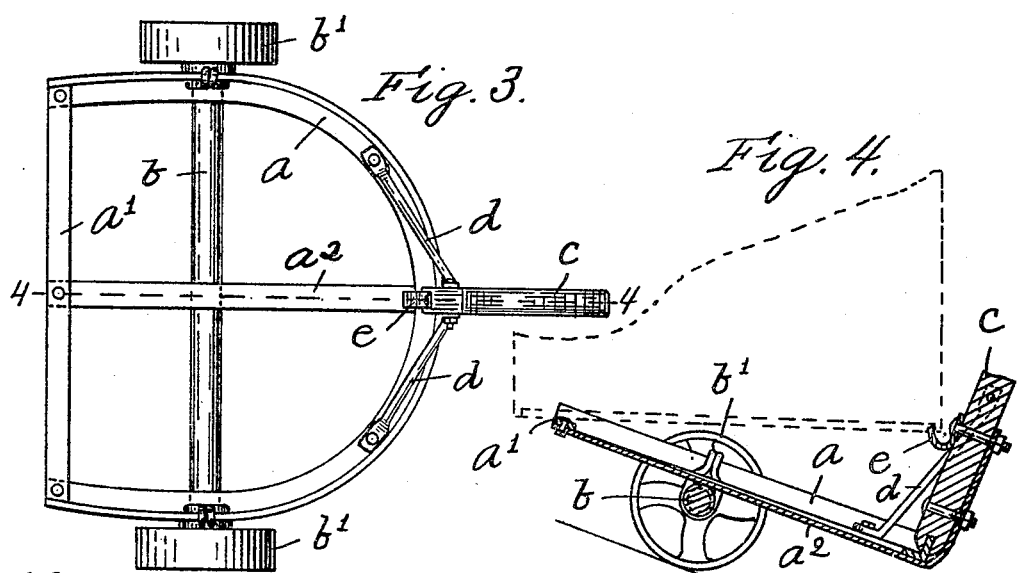

UNITED STATES PATENT OFFICE.

JOHN T. HOURIHAN, OF BOSTON, MASSACHUSETTS.

TRUCK.

No. 800,445. Specification of Letters Patent. Patented Sept. 26, 1905.

Application filed December 19, 1904. Serial No. 237,565.

*To all whom it may concern:*

Be it known that I, JOHN T. HOURIHAN, of Boston, county of Suffolk, State of Massachusetts, have invented an Improvement in Trucks, of which the following description, in connection with the accompanying drawings, is a specification, like characters on the drawings representing like parts.

This invention relates to trucks especially adapted for barrels, and has for its object to improve the construction of the same to the end that the barrel may be held in a perpendicular position and well balanced; that the platform upon which the barrel rests may be light, yet exceptionally strong and durable; that said platform be provided with a guide for the barrel; that a single handle may be employed which is securely fastened to the platform, and that the barrel may be supported in perpendicular position when the truck is on an incline.

Figure 1 shows in side elevation a truck embodying this invention. Fig. 2 is a front elevation of the truck shown in Fig. 1. Fig. 3 is a plan view of the truck shown in Fig. 1. Fig. 4 is a vertical section of the truck shown in Fig. 3, taken on the dotted line 4 4.

The platform of the truck comprises, essentially, a bar $a$, of angle-iron, bent U shape, a cross-bar $a'$, attached to its free ends, and a cross-bar $a^2$, disposed at right angles to said cross-bar $a'$, which extends through the middle of the platform. The cross-bar $a'$ represents the front edge of the platform. The cross-bar $a^2$ is attached to the cross-bar $a'$ and to the angle-iron bar. The angle-iron bar is arranged to present a horizontal portion and an upright or vertical portion at the outer side thereof, the former forming a part of the bottom of the platform and the latter serving as a guide for the barrel. The cross-bar $a'$ is made of flat iron and is attached at its ends to the horizontal portion of the angle-iron bar. The cross-bar $a^2$ is also made of flat iron and extends across the platform, as shown, and serves as the middle supporting-bar. The platform rests upon and is connected to an axletree $b$, upon the opposite ends of which truck-wheels $b'$ are mounted to revolve freely. As shown, it will be observed that both the angle-iron bar and the middle supporting-bar rest upon said axletree. This is preferable, but not material.

As a means of connecting the axletree to the platform wire clips are passed around the axletree entering grooves therein, and then through holes in the horizontal portion of the angle-iron bar, and then over the upper edge of the upright portion of said bar. I do not, however, desire to limit my invention to the particular manner herein shown of attaching the platform to the axle.

$c$ represents a handle which is made as a bar, with its upper end curved and fashioned to be grasped by the operator, and but a single handle is employed. The middle supporting-bar $a^2$ is extended upward beyond the angle-iron bar and is attached by bolts or otherwise to the lower end of the handle-bar to thereby secure said handle-bar to the platform. To further assist in securing the handle-bar to the platform, its lower end is slotted to receive the upright portion of the angle-iron bar, and by thus embracing said bar a certain leverage upon it is obtained. The handle-bar $c$ is furthermore secured to the platform or braced by diagonal bars $d$, the upper ends of which are connected to the handle-bar and the lower ends to the angle-iron bar.

Ordinarily the barrel is placed upon the platform, as represented by dotted lines, Fig 1, and it will be seen that the barrel is held in perpendicular position and is well balanced. When it is desired to run the truck up an incline, the edge of the barrel adjacent the handle-bar is raised onto a projection $e$, which is attached to the handle-bar near its lower end, (see Fig. 4,) and the barrel when thus supported will be well balanced.

I do not desire to limit my invention to the employment of all of the structural features herein shown and described, as it is obvious that some of them may be omitted.

Having thus described my invention, what I claim as new, and desire to secure by Letters Patent, is—

1. In a truck, a U-shaped angle-iron bar arranged to present a horizontal portion and an upright portion at the outer side of the horizontal portion, a cross-bar attached to its free ends, a handle-bar connected to said U-shaped bar, and a pair of supporting-wheels, substantially as described.

2. In a truck, a U-shaped angle-iron bar, arranged to present a horizontal portion and an upright portion at the outer side of the horizontal portion, a cross-bar attached to its free ends, a middle supporting-bar attached to said cross-bar and to the U-shaped bar, an axletree upon which said U-shaped bar and the middle supporting-bar rest, wheels borne by said axletree, and a handle-bar attached to said U-shaped bar, substantially as described.

3. In a truck, a platform comprising a U-shaped frame having a cross-bar attached to its free ends, a middle supporting-bar attached to said cross-bar and to the frame, and having an upward extension beyond the frame, a handle-bar bolted to said extension and an axletree upon which said platform rests and wheels borne by it, substantially as described.

4. In a truck, a platform comprising a U-shaped angle-iron frame, a portion thereof extending upward, and a cross-bar attached to its free ends, a handle-bar slotted at its lower end to engage the angle-iron frame, means for attaching said handle-bar to the platform, and supporting-wheels, substantially as described.

5. In a truck, a platform, a handle-bar connected thereto having a forwardly-extended projection near its lower end adapted to receive upon it the edge of a barrel, and supporting-wheels, substantially as described.

In testimony whereof I have signed my name to this specification in the presence of two subscribing witnesses.

JOHN T. HOURIHAN.

Witnesses:
P. McMorrow,
Jas. H. Leonard.